United States Patent
Gayney et al.

(10) Patent No.: US 11,413,947 B2
(45) Date of Patent: Aug. 16, 2022

(54) BEARING AND SHAFT ARRANGEMENT FOR ELECTRIC DRIVE UNIT

(71) Applicant: GM Global Technology Operations LLC, Detroit, MI (US)

(72) Inventors: Jack Gayney, Grosse Ile, MI (US); Gregory Deneszczuk, Royal Oak, MI (US); Boris Burgman, Oak Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 348 days.

(21) Appl. No.: 16/719,377

(22) Filed: Dec. 18, 2019

(65) Prior Publication Data

US 2021/0188067 A1   Jun. 24, 2021

(51) Int. Cl.
| | |
|---|---|
| *B60K 1/02* | (2006.01) |
| *H02K 5/173* | (2006.01) |
| *H02K 7/00* | (2006.01) |
| *H02K 7/08* | (2006.01) |
| *B60K 17/04* | (2006.01) |

(Continued)

(52) U.S. Cl.
CPC ............... *B60K 1/02* (2013.01); *B60K 17/04* (2013.01); *F16C 19/10* (2013.01); *F16C 19/54* (2013.01); *H02K 5/1735* (2013.01); *H02K 7/006* (2013.01); *H02K 7/085* (2013.01); *H02K 7/116* (2013.01);

(Continued)

(58) Field of Classification Search
CPC .......... B60K 1/02; B60K 17/04; B60K 17/22; F01D 5/14; F01D 5/147; F01D 5/3007; F05D 2220/32; F05D 2230/10; F05D 2230/80; F05D 2240/20; F05D 2260/941; F16C 19/10; F16C 19/54; F16C 2326/01; F16C 2361/65; F16C 3/02; H02K 16/00; H02K 2205/03; H02K 5/1735; H02K 7/006; H02K 7/085; H02K 7/116; Y02T 50/60
See application file for complete search history.

(56) References Cited

U.S. PATENT DOCUMENTS

| | | | | |
|---|---|---|---|---|
| 2013/0345009 | A1 * | 12/2013 | Iwasa ................... | F16H 57/021 475/5 |
| 2014/0113760 | A1 * | 4/2014 | Diemer ................ | B60K 6/365 475/149 |

(Continued)

FOREIGN PATENT DOCUMENTS

| | | | | |
|---|---|---|---|---|
| CA | 2988922 A1 | * | 7/2018 | ............. B60K 11/06 |
| DE | 102020128934 B3 | * | 11/2021 | |
| WO | WO-2006137589 A1 | * | 12/2006 | ............. B60K 6/365 |

*Primary Examiner* — Naishadh N Desai
(74) *Attorney, Agent, or Firm* — Vivacqua Crane PLLC

(57) ABSTRACT

A bearing and shaft arrangement of an automobile vehicle electric drive unit includes a gearbox. A first electric motor within the gearbox is engaged with and axially rotates a first shaft within the gearbox. A second electric motor within the gearbox is engaged with and axially rotates a second shaft within the gearbox. A first roller bearing assembly supports the first shaft to a first structural member of the gearbox. A second roller bearing assembly supports the second shaft to the first structural member of the gearbox. A thrust bearing is positioned between the first roller bearing assembly and the second roller bearing assembly and directly contacts the first shaft and the second shaft in a drive mode and reacts a first axial load of the first shaft and a second axial load of the second shaft directed toward the first axial load.

16 Claims, 2 Drawing Sheets

(51) Int. Cl.
*F16C 19/54* (2006.01)
*F16C 19/10* (2006.01)
*H02K 7/116* (2006.01)

(52) U.S. Cl.
CPC ...... *F16C 2361/65* (2013.01); *H02K 2205/03* (2013.01)

(56) References Cited

U.S. PATENT DOCUMENTS

| | | | | |
|---|---|---|---|---|
| 2015/0180304 A1* | 6/2015 | Miller | ............ | F16H 57/12 475/149 |
| 2019/0222096 A1* | 7/2019 | Bastian, II | ............ | H02K 1/27 |
| 2021/0083546 A1* | 3/2021 | Garcia | ............ | H02K 7/006 |

* cited by examiner

BEARING AND SHAFT ARRANGEMENT FOR ELECTRIC DRIVE UNIT

INTRODUCTION

The present disclosure relates to automobile vehicle electric drive units.

Automobile vehicle transmissions commonly support half shafts using tapered bearings that require preloading. Tapered bearings permit minimal axial displacement of the half shafts, however tapered bearings impart thrust and frictional loads that are reacted using structure of a transmission housing. The use of tapered bearings therefore are accommodated by additional structure of a transmission housing, and also increase a noise, vibration harshness (NVH) of the transmission.

It is also common for the half-shafts to be independently positioned and supported in an off-axis configuration due to the structure and bearing designs required to carry the shaft axial and radial loads. Bearings positioned proximate to outer walls of the transmission housing increase noise output and require added structure and weight to accommodate.

Thus, while current automobile vehicle electric drive units achieve their intended purpose, there is a need for a new and improved system and method for arranging bearings and shafts of an automobile vehicle electric drive unit.

SUMMARY

According to several aspects, a bearing and shaft arrangement of an electric drive unit, including a gearbox. A first electric motor is engaged with and axially rotates a first shaft within the gearbox, defining rotation about a longitudinal axis of rotation of the shaft. A second electric motor is engaged with and axially rotates a second shaft within the gearbox. A reaction bearing member is positioned between and directly contacts the first shaft and the second shaft and reacts a first axial load of the first shaft and a second axial load of the second shaft directed toward the first axial load.

In another aspect of the present disclosure, the reaction bearing member is a thrust bearing.

In another aspect of the present disclosure, a first motor shaft is rotated by operation of the first electric motor; and a first transfer shaft is engaged with and is axially rotated by the first motor shaft. The first transfer shaft is engaged with and directly axially rotates the first shaft.

In another aspect of the present disclosure, a second motor shaft is rotated by operation of the second electric motor; and a second transfer shaft is engaged with and is axially rotated by the second motor shaft. The second transfer shaft is engaged with and directly axially rotates the second shaft.

In another aspect of the present disclosure, a first roller bearing assembly supports a first end of the first shaft to a first structural member of the gearbox; and a second roller bearing assembly supports a third end of the second shaft to the first structural member of the gearbox.

In another aspect of the present disclosure, a first ball bearing assembly supports a second end of the first shaft to a second structural member of the gearbox; and a second ball bearing assembly supports a fourth end of the second shaft to a third structural member of the gearbox.

In another aspect of the present disclosure, the first roller bearing assembly and the first ball bearing assembly define a free-free bearing assembly, wherein a radial load of the first shaft is reacted by the first roller bearing assembly and the first ball bearing assembly with the thrust bearing reacts the first axial load of the first shaft.

In another aspect of the present disclosure, the second roller bearing assembly and the second ball bearing assembly define a free-free bearing assembly, wherein a radial load of the second shaft is reacted by the second roller bearing assembly and the second ball bearing assembly with the thrust bearing reacts the second axial load of the second shaft.

In another aspect of the present disclosure, a first fixing member is positioned between the first roller bearing assembly and the first structural member to axially fix the first roller bearing assembly with respect to the first structural member; and a second fixing member is positioned between the second roller bearing assembly and the first structural member to axially fix the second roller bearing assembly with respect to the first structural member.

In another aspect of the present disclosure, a first structural member is provided with the gearbox; and a first transfer gear of the first transfer shaft is meshed with the first structural member and a second transfer gear is meshed with the first shaft.

In another aspect of the present disclosure, a third transfer gear of the second transfer shaft is meshed with the first structural member and a fourth transfer gear is meshed with the second shaft.

According to several aspects, a bearing and shaft arrangement of an electric drive unit includes a gearbox. A first electric motor within the gearbox is engaged with and axially rotates a first shaft within the gearbox. A second electric motor within the gearbox is engaged with and axially rotates a second shaft within the gearbox. A first roller bearing assembly supports the first shaft to a first structural member of the gearbox. A second roller bearing assembly supports the second shaft to the first structural member of the gearbox. A thrust bearing is positioned between the first roller bearing assembly and the second roller bearing assembly and directly contacts the first shaft and the second shaft in a drive mode and reacts a first axial load of the first shaft and a second axial load of the second shaft directed toward the first axial load.

In another aspect of the present disclosure, a first ball bearing assembly supports an end of the first shaft positioned opposite to the first roller bearing assembly to a second structural member of the gearbox; and a spacing member is positioned between the first ball bearing assembly and the second structural member axially positioning the first ball bearing assembly within the gearbox.

In another aspect of the present disclosure, a second ball bearing assembly supports an end of the second shaft positioned opposite to the second roller bearing assembly to a third structural member of the gearbox.

In another aspect of the present disclosure, the first shaft and the second shaft are together coaxially aligned on and rotate on a rotational axis.

In another aspect of the present disclosure, in a regenerative mode, defining an un-powered forward directional operation, outwardly and oppositely directed axial forces of the first shaft and the second shaft are generated which are oppositely directed with respect to the first axial load and the second axial load.

In another aspect of the present disclosure, a first ball bearing assembly supports an end of the first shaft, is positioned opposite to the first roller bearing assembly and reacts a radial load of the first shaft; and a second ball bearing assembly supports an end of the second shaft, is positioned opposite to the second roller bearing assembly and reacts a radial load of the second shaft.

In another aspect of the present disclosure, the outwardly directed axial forces are reacted by a spacer of the first ball bearing assembly positioned against a second structural member of the gearbox and by a race of the second roller bearing assembly positioned against a third structural member of the gearbox.

According to several aspects, a bearing and shaft arrangement of an automobile vehicle electric drive unit includes a housing. A first electric motor within the housing is engaged with and axially rotates a first shaft within the housing. A second electric motor within the housing is engaged with and axially rotates a second shaft within the housing. A first roller bearing assembly supports the first shaft to a first structural member of the housing. A second roller bearing assembly supports the second shaft to the first structural member of the housing. A thrust bearing is positioned between the first roller bearing assembly and the second roller bearing assembly and directly contacting the first shaft and the second shaft in a drive mode and reacting a first axial load of the first shaft and a second axial load of the second shaft directed toward the first axial load. A first ball bearing assembly supports an end of the first shaft positioned opposite to the first roller bearing assembly and reacts a radial load of the first shaft. A second ball bearing assembly supports an end of the second shaft positioned opposite to the second roller bearing assembly and reacts a radial load of the second shaft.

In another aspect of the present disclosure, in a regenerative mode, defining an un-powered forward directional operation of the automobile vehicle, outwardly and oppositely directed axial loads of the first shaft and the second shaft are generated which are oppositely directed with respect to the first axial load and the second axial load, and are reacted by the first ball bearing assembly and the second ball bearing assembly, with zero axial load applied to the thrust bearing.

In another aspect of the present disclosure, a first motor shaft is rotated by operation of the first electric motor, a first transfer shaft is engaged with and is axially rotated by the first motor shaft, with the first transfer shaft engaged with and directly axially rotating the first shaft; a second motor shaft is rotated by operation of the second electric motor, a second transfer shaft is engaged with and is axially rotated by the second motor shaft, with the second transfer shaft engaged with and directly axially rotating the second shaft; wherein the first transfer shaft includes a first transfer gear meshed with the first structural member and a second transfer gear meshed with the first shaft, and the second transfer shaft includes a third transfer gear meshed with the first structural member and a fourth transfer gear meshed with the second shaft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
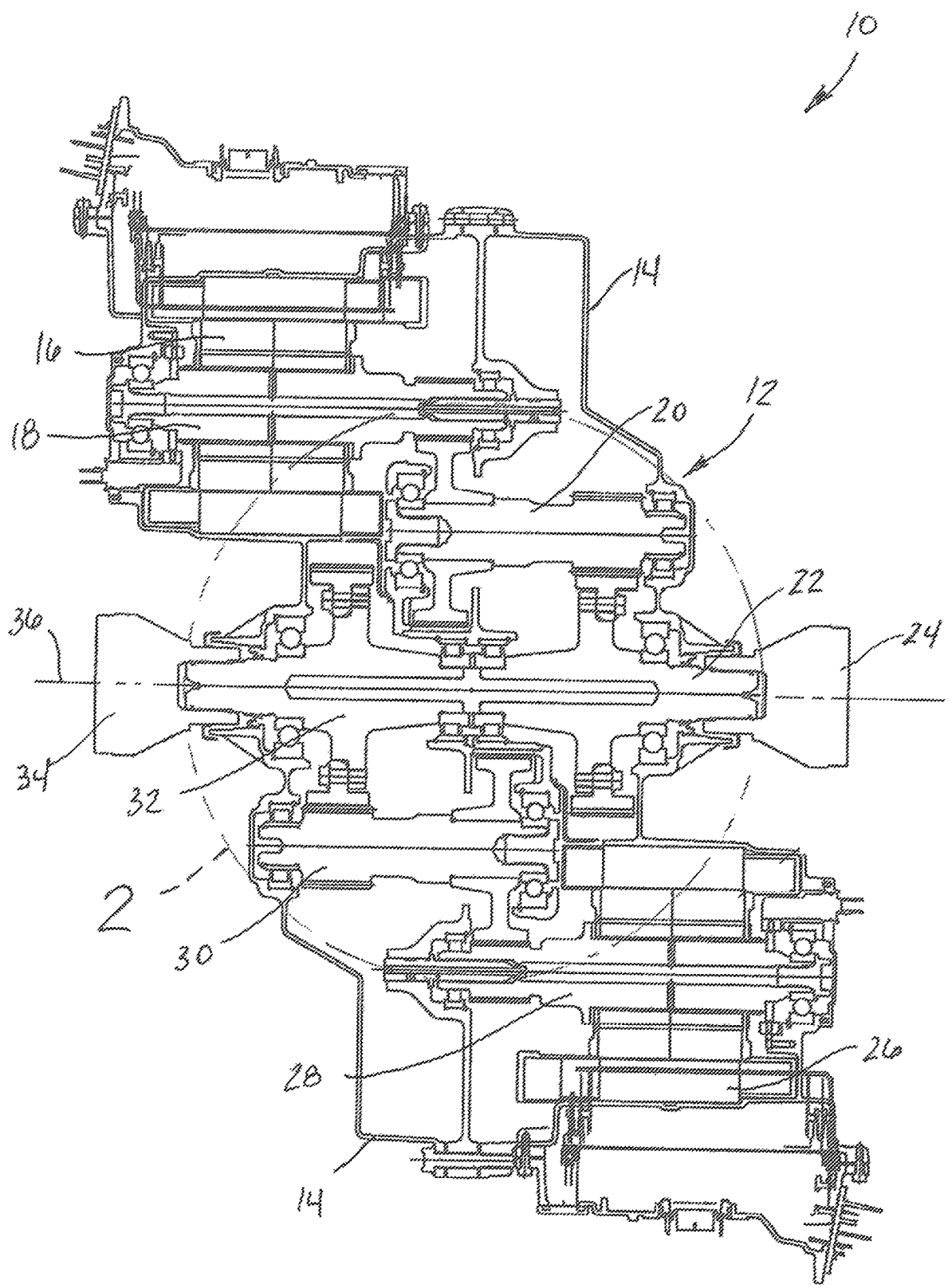
FIG. 1 is a side elevational cross-sectional view of a dual-drive transmission having a bearing and shaft arrangement according to an exemplary aspect.

Referring to FIG. 1, a bearing and shaft arrangement 10 for an electric drive unit 12 includes a housing such as a gearbox 14 having a first electric motor 16. The first electric motor 16 engages and axially rotates a first motor shaft 18 defining rotation about a longitudinal axis of rotation of the shaft within the gearbox 14. The first motor shaft 18 is engaged with and axially rotates a first transfer shaft 20 within the gearbox 14. The first transfer shaft 20 is engaged with and axially rotates a first shaft 22 within the gearbox 14. According to several aspects the first shaft 22 defines a half-shaft. The first shaft 22 is coupled to and rotates a first wheel hub 24. Within the gearbox 14 the electric drive unit 12 also includes a second electric motor 26. The second electric motor 26 engages and axially rotates a second motor shaft 28 within the gearbox 14. The second motor shaft 28 is engaged with and axially rotates a second transfer shaft 30 within the gearbox 14. The second transfer shaft 30 is engaged with and axially rotates a second shaft 32 within the gearbox 14. According to several aspects, the second shaft 32 defines a half-shaft. The second shaft 32 is coupled to and rotates a second wheel hub 34. According to several aspects the first shaft 22 and the second shaft 32 are commonly axially disposed and rotate on a rotational axis 36.

Figure 2:
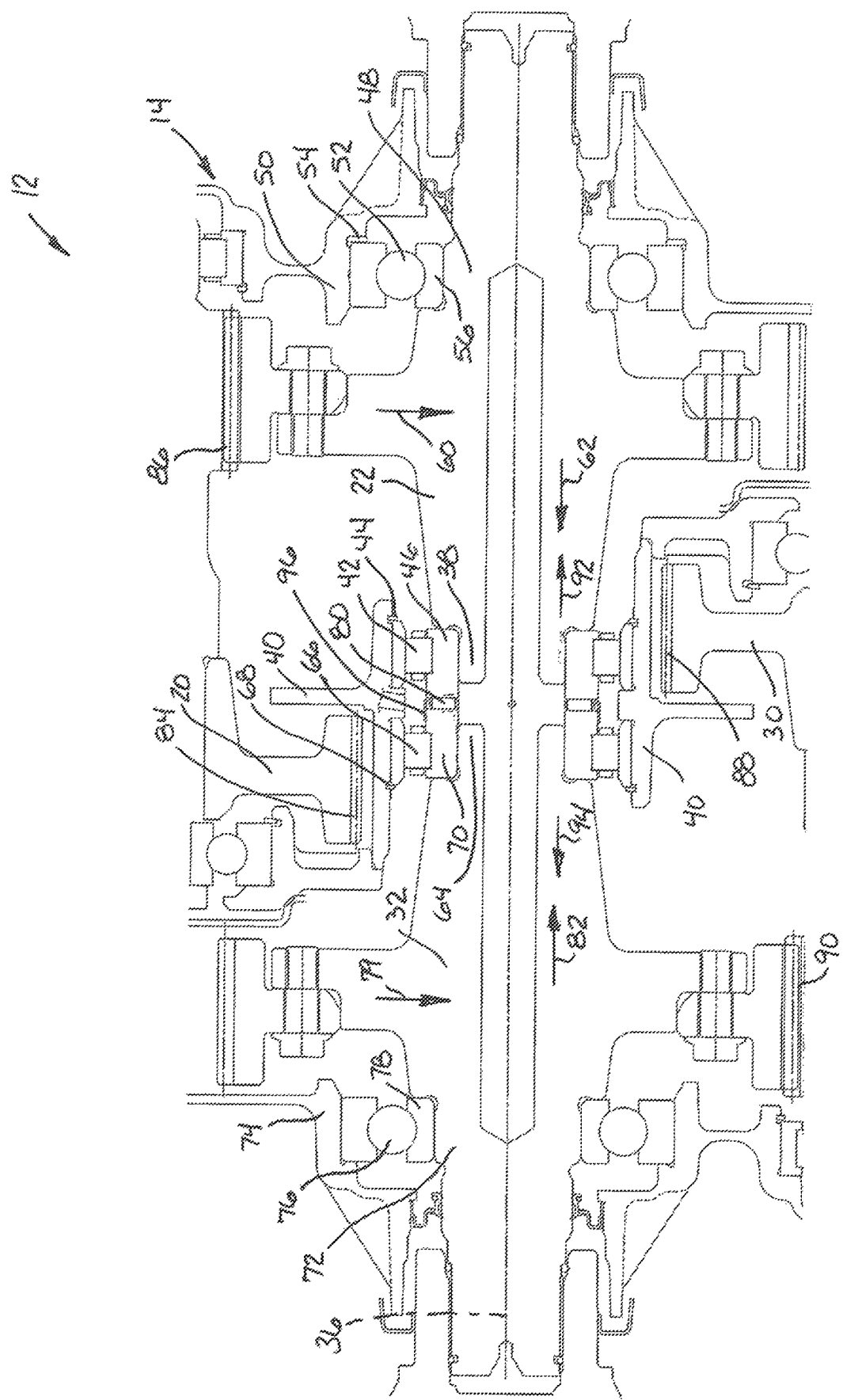
FIG. 2 is a side elevational cross-sectional view of area 2 of FIG. 1.

Referring to FIG. 2 and again to FIG. 1, an inward-facing first end 38 of the first shaft 22 is rotatably supported to an internal first structural member 40 of the gearbox 14 using a first roller bearing assembly 42. A first fixing member 44 such as a first clip is positioned between the first roller bearing assembly 42 and the first structural member 40 axially fixing the first roller bearing assembly 42 with respect to the first structural member 40. Unlike the outer race, an inner race 46 of the first roller bearing assembly 42 is not axially fixed and is therefore "free" with respect to the inward-facing first end 38 of the first shaft 22.

An outward-facing second end 48 of the first shaft 22 is rotatably supported to a second structural member 50 of the gearbox 14 using a first ball bearing assembly 52. A spacing member 54 such as a washer is positioned between the first ball bearing assembly 52 and the second structural member 50 axially positioning the first ball bearing assembly 52 within the gearbox 14, and a race 56 of the first ball bearing assembly 52 is not axially fixed and is therefore "free" with respect to the second end 48 of the first shaft 22. During operation of the electric drive unit 12 in a drive mode, defining a powered forward directionally driven mode of an automobile vehicle having the electric drive unit 12, a radial force 60 acting transverse to the rotational axis 36 of the first shaft 22 is carried by the first roller bearing assembly 42 and the first ball bearing assembly 52. During operation of the electric drive unit 12 in drive mode an inwardly directed axial force 62 is also generated. The first shaft 22 is free to axially displace as a result of the inwardly directed axial force 62 with respect to the first roller bearing assembly 42 and to the first structural member 40 as well as with respect to the first ball bearing assembly 52 and the second structural member 50.

Because the first ball bearing assembly 52 only carries an axial load in a single direction, the same direction as the inwardly directed axial force 62, retention of the first ball bearing assembly 52 is only required in a single direction, the same direction as the inwardly directed axial force 62. In regenerative mode and in reverse, the first shaft 22 presses on the inner race 56 of the first ball bearing assembly 52. This load is reacted through the balls of the first ball bearing assembly 52 into an outer race and grounded at the second structural member 50 of the gearbox 14. In drive mode the first ball bearing assembly 52 becomes un-loaded and due to a clearance at the outside diameter, due to a slip-fit interface, no axial load is carried through. The function of a second ball bearing assembly 76 described below is similar, with oppositely directed axial loads.

An inward-facing third end 64 of the second shaft 32 is also rotatably supported to the internal first structural member 40 of the gearbox 14 using a second roller bearing assembly 66. A second fixing member 68 such as a clip is positioned between the second roller bearing assembly 66 and the first structural member 40 axially fixing the second roller bearing assembly 66 with respect to the first structural member 40. Unlike the outer race, an inner race 70 of the second roller bearing assembly 66 is not axially fixed and is therefore "free" with respect to the inward-facing third end 64 of the second shaft 32. The second shaft 32 is therefore free to axially displace with respect to the second roller bearing assembly 66 and to the first structural member 40.

An outward-facing fourth end 72 of the second shaft 32 is rotatably supported to a third structural member 74 of the gearbox 14 using the second ball bearing assembly 76. The spacing member 54 such as the washer is not used between the second ball bearing assembly 76 and the third structural member 74 to axially position the second ball bearing assembly 76 within the gearbox 14, and a race 78 of the second ball bearing assembly 76 is not axially fixed and is therefore "free" with respect to the outward-facing fourth end 72 of the second shaft 32. The second shaft 32 is therefore free to axially displace with respect to the second ball bearing assembly 76 and with respect to the third structural member 74.

During operation of the electric drive unit 12 in drive mode, a radial force 79 acting transverse to the rotational axis 36 of the second shaft 32 is carried by the second roller bearing assembly 66 and the second ball bearing assembly 76. During operation of the electric drive unit 12 in drive mode opposing helix hands of the gears drive axial loads of the first shaft 22 and the second shaft 32 oppositely and toward a center of the gearbox 14. To react the inwardly directed opposed axial displacements of the first shaft 22 and the second shaft 32, a reaction bearing member, such as a thrust bearing 80 is positioned between the inward-facing first end 38 of the first shaft 22 and the inward-facing third end 64 of the second shaft 32. Instead of the thrust bearing 80, the reaction bearing member may alternatively be provided as a thrust washer or as another type of reaction bearing member, without falling beyond the spirit and scope of the present disclosure. The thrust bearing 80 is positioned between and is directly contacted by the inner race 46 of the first roller bearing assembly 42 and by the inner race 70 of the second roller bearing 66 during drive mode of operation. The axial loads of the second shaft 32 generate an inwardly directed axial force 82 which is oppositely directed with respect to the inwardly directed axial force 62 of the first shaft 22. The second shaft 32 is free to axially displace as a result of the axial force 82 with respect to the second bearing assembly 66 and with respect to the first structural member 40 as well as with respect to the second ball bearing assembly 76 and the third structural member 74.

The thrust bearing 80 carries all axial loads in drive mode that are driven by the gears. Due to inconsistencies in tire tread, air pressure, tire size, or vehicle maneuvering the thrust bearing 80 must allow for differential speeds between the first shaft 22 and the second shaft 32. The thrust bearing 80 therefore defines a low speed differential allowing a speed difference in tire slip, or due to a tire output speed difference. By reacting the opposed axial thrusts of the first shaft 22 and the second shaft 32 using the thrust bearing 80, a reduction in size of the first and second ball bearing assemblies 52, 76 is allowed, which only have to react the radial forces 60, 79. Reducing the size of the first and second ball bearing assemblies 52, 76 reduces cost, reduces mass, improves NVH and improves efficiency by limiting rotational friction.

The thrust bearing 80 obviates the need for tapered bearings to take axial loads of the shafts that require preloading, and therefore provides a more efficient system composed of cylindrical or roller bearing assemblies and ball bearing assemblies to take shaft radial loads. The roller and ball bearing assemblies are arranged in a fixed-free design for each shaft, yet as a system perform as a free-free design. In this arrangement, the shafts such as the exemplary half-shafts shown axially thrust together in drive mode and the opposed axial loads are reacted by the thrust bearing 80, allowing the two shafts to have a speed differential. The cancellation of axial loads by the thrust bearing 80 allows for smaller and more efficient ball bearing assemblies and the elimination of losses from axial loading of the ball bearing assemblies.

With continuing reference to FIG. 2 and again to FIG. 1, multiple gears of a gear train are presented. The first transfer shaft 20 includes a first transfer gear 84 meshed with the first motor shaft 18 (more clearly shown in FIG. 1) and a second transfer gear 86 meshed with the first shaft 22. Similarly, the second transfer shaft 30 includes a third transfer gear 88 meshed with the second motor shaft 28 (more clearly shown in FIG. 1) and a fourth transfer gear 90 meshed with the second shaft 32. Opposing helix hands are provided for the transfer gears. For example, the second transfer gear 86 and the fourth transfer gear 90 have opposing helix hands. In drive mode, axial loads imparted by the opposing hands of the transfer gears are canceled out by the thrust bearing 80 positioned between and contacted by the first shaft 22 and the second shaft 32. The thrust bearing 80 therefore eliminates the need to mesh the transfer gears while pressing middle bearings simultaneously which is common to typical bearing arrangements. In the present disclosure, the ball bearing assemblies and the roller bearing assemblies are internal diameter (ID) pressed and can outside diameter (OD) slip and thus do not add to the complexity of pressing while simultaneously meshing the transfer gears.

Because the roller bearing assemblies and the ball bearing assemblies carry radial loads and because the thrust bearing 80 is positioned near a center of the mass of the gearbox 14, the thrust bearing 80 arrangement forces the noise paths to the internal components and structure in the electric drive unit 12 in lieu of to the outside walls of the gearbox 14 of the electric drive unit 12, thereby improving the noise, vibration, harshness (NVH) of the electric drive unit 12.

During operation of the electric drive unit 12 in a regenerative mode, defining an un-powered forward directional operation of the automobile vehicle having the electric drive unit 12 the radial force 60 acting transverse to the rotational axis 36 of the first shaft 22 is continued to be carried by the first roller bearing assembly 42 and the first ball bearing assembly 52 and the radial force 79 acting transverse to the rotational axis 36 of the second shaft 32 is continued to be carried by the second roller bearing assembly 66 and the second ball bearing assembly 76. During operation of the electric drive unit 12 in the regenerative mode outwardly directed axial forces 92, 94 of the first shaft 22 and the second shaft 32 are generated which are oppositely directed with respect to the inwardly directed axial forces 62, 82. The outwardly directed axial forces 92, 94 are reacted by the washer 54 of the first ball bearing assembly 52 against the second structural member 50 and by the race of the second ball bearing assembly 76 against the third structural member 74. The outwardly directed axial forces 92, 94 are smaller and occur less often than the inwardly directed axial forces 62, 82 which occur in drive mode. It is noted the thrust bearing 80 is piloted using an exemplary pilot 96 shown for assembly and to maintain position of the thrust bearing 80 during use. The design of the pilot 96 is not limiting, as other pilot designs may be used. It is further noted that in regenerative mode the first shaft 22 spatially separates from the second shaft 32, and no force is reacted by the thrust bearing 80, thereby limiting frictional loading of the bearing assemblies of the present disclosure.

The present arrangement includes two output shafts, which may be half-shafts driven by independent and dedicated electric motors through a gear train. Opposing helix hands of the gears of the gear train driving the half-shafts are driven in the same direction which results in the half-shafts being thrust either toward each other in a drive mode or away from each other in a regenerative mode and in reverse. A thrust bearing is positioned directly between facing ends of the half-shafts to cancel axial loads of the half-shafts when driven toward each other in drive mode. Ball bearing assemblies take axial loads of the half-shafts and cylindrical or roller bearings carry radial loads of the half-shafts. The ball bearing assemblies are unloaded in drive mode, which reduces bearing loading in drive mode.

A bearing and shaft arrangement for an electric drive unit of the present disclosure offers several advantages. These include an arrangement of shafts and bearings that allows a thrust bearing to share and cancel axial loads of two opposing half-shafts while in a drive mode and in turn allows for differentiation of speed and torque. The bearing arrangement further includes ball bearing assemblies that carry axial loads of the half-shafts in a regenerative mode and in reverse, and cylindrical roller bearing assemblies which carry radial loads and which position gears. The cancellation of axial loads of the half-shafts using the thrust bearing allows for smaller and more efficient ball bearing assemblies and the elimination of losses due to axial loading of the ball bearing assemblies.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A bearing and shaft arrangement of an automobile vehicle electric drive unit, comprising:
   a gearbox;
   a first electric motor operating to axially rotate a first shaft within the gearbox;
   a second electric motor operating to axially rotate a second shaft within the gearbox;
   a reaction bearing member positioned between and directly contacted by the first shaft and the second shaft in a drive mode and reacting to a first axial load of the first shaft and a second axial load of the second shaft directed toward the first axial load;
   a first roller bearing assembly supporting a first end of the first shaft to a first structural member of the gearbox;
   a second roller bearing assembly supporting a first end of the second shaft to the first structural member of the gearbox;
   a first ball bearing assembly supporting a second end of the first shaft to a second structural member of the gearbox; and
   a second ball bearing assembly supporting a second end of the second shaft to a third structural member of the gearbox,
   wherein a radial load of the first shaft is reacted by the first roller bearing assembly and the first ball bearing assembly with reaction bearing member reacting the first axial load of the first shaft, and wherein a radial load of the second shaft is reacted by the second roller bearing assembly and the second ball bearing assembly with the reaction bearing member reacting the second axial load of the second shaft.

2. The bearing and shaft arrangement of the automobile vehicle electric drive unit of claim 1, the reaction bearing member being a thrust bearing.

3. The bearing and shaft arrangement of the automobile vehicle electric drive unit of claim 2, further including:
   a first motor shaft rotated by operation of the first electric motor; and
   a first transfer shaft engaged with and axially rotated by the first motor shaft, wherein the first transfer shaft is engaged with and directly axially rotates the first shaft.

4. The bearing and shaft arrangement of the automobile vehicle electric drive unit of claim 3, further including:
   a second motor shaft rotated by operation of the second electric motor; and
   a second transfer shaft engaged with and axially rotated by the second motor shaft, wherein the second transfer shaft is engaged with and directly axially rotates the second shaft.

5. The bearing and shaft arrangement of the automobile vehicle electric drive unit of claim 4, further including a first transfer gear of the first transfer shaft meshed with the first motor shaft and a second transfer gear of the first transfer shaft meshed with the first shaft.

6. The bearing and shaft arrangement of the automobile vehicle electric drive unit of claim 5, further including a third transfer gear of the second transfer shaft meshed with the second motor shaft and a fourth transfer gear of the second transfer shaft meshed with the second shaft.

7. The bearing and shaft arrangement of the automobile vehicle electric drive unit of claim 5, further including:
   a first structural member of the gearbox;
   a first fixing member positioned between the first roller bearing assembly and the first structural member axially fixing the first roller bearing assembly to the first structural member; and
   a second fixing member positioned between the second roller bearing assembly and the first structural member axially fixing the second roller bearing assembly to the first structural member.

8. A bearing and shaft arrangement of an automobile vehicle electric drive unit, comprising:
   a gearbox;
   a first electric motor within the gearbox operating to axially rotate a first shaft within the gearbox;
   a second electric motor within the gearbox operating to axially rotate a second shaft within the gearbox;

a first roller bearing assembly supporting the first shaft to a first structural member of the gearbox;

a second roller bearing assembly supporting the second shaft to the first structural member of the gearbox; and a thrust bearing positioned between the first roller bearing assembly and the second roller bearing assembly and directly contacted by the first shaft and the second shaft in a drive mode and reacting to a first axial load of the first shaft and a second axial load of the second shaft directed toward the first axial load, wherein in a regenerative mode, defining an un-powered forward directional operation, outwardly and oppositely directed axial forces of the first shaft and the second shaft are generated which are oppositely directed with respect to the first axial load and the second axial load.

9. The bearing and shaft arrangement of the automobile vehicle electric drive unit of claim 8, further including:

a first ball bearing assembly supporting an end of the first shaft positioned opposite to the first roller bearing assembly to a second structural member of the gearbox; and a spacing member positioned between the first ball bearing assembly and the second structural member to axially position the first ball bearing assembly within the gearbox.

10. The bearing and shaft arrangement of the automobile vehicle electric drive unit of claim 9, further including a second ball bearing assembly supporting an end of the second shaft positioned opposite to the second roller bearing assembly to a third structural member of the gearbox.

11. The bearing and shaft arrangement of the automobile vehicle electric drive unit of claim 8, wherein the first shaft and the second shaft are together coaxially aligned on and rotate on a rotational axis.

12. The bearing and shaft arrangement of the automobile vehicle electric drive unit of claim 8, further including:

a first ball bearing assembly supporting an end of the first shaft positioned opposite to the first roller bearing assembly and reacts a radial load of the first shaft; and a second ball bearing assembly supporting an end of the second shaft positioned opposite to the second roller bearing assembly and reacts a radial load of the second shaft.

13. The bearing and shaft arrangement of the automobile vehicle electric drive unit of claim 12, wherein the outwardly and oppositely directed axial forces are reacted by a spacer of the first ball bearing assembly positioned against a second structural member of the gearbox and by a race of the second roller bearing assembly positioned against a third structural member of the gearbox.

14. A bearing and shaft arrangement of an automobile vehicle electric drive unit, comprising:

a housing;

a first electric motor within the housing engaged with and axially rotating a first shaft within the housing;

a second electric motor within the housing engaged with and axially rotating a second shaft within the housing;

a first roller bearing assembly supporting the first shaft to a first structural member of the housing;

a second roller bearing assembly supporting the second shaft to the first structural member of the housing;

a thrust bearing positioned between the first roller bearing assembly and the second roller bearing assembly and directly contacting the first shaft and the second shaft in a drive mode and reacting to a first axial load of the first shaft and a second axial load of the second shaft directed toward the first axial load;

a first ball bearing assembly supporting an end of the first shaft positioned opposite to the first roller bearing assembly and reacting to a first radial load of the first shaft; and a second ball bearing assembly supporting an end of the second shaft positioned opposite to the second roller bearing assembly and reacting to a second radial load of the second shaft.

15. The bearing and shaft arrangement of the automobile vehicle electric drive unit of claim 14, wherein in a regenerative mode, defining an un-powered forward directional operation of the automobile vehicle, outwardly and oppositely directed axial loads of the first shaft and the second shaft are generated which are oppositely directed with respect to the first axial load and the second axial load, and are reacted by the first ball bearing assembly and the second ball bearing assembly, with zero axial load applied to the thrust bearing.

16. The bearing and shaft arrangement of the automobile vehicle electric drive unit of claim 14, further including:

a first motor shaft rotated by the first electric motor;

a first transfer shaft engaged with and axially rotated by the first motor shaft, wherein the first transfer shaft is engaged with and directly axially rotates the first shaft;

a second motor shaft rotated by the second electric motor; and a second transfer shaft engaged with and axially rotated by the second motor shaft, wherein the second transfer shaft is engaged with and directly axially rotates the second shaft; and wherein the first transfer shaft includes a first transfer gear meshed with the first structural member and a second transfer gear meshed with the first shaft, and the second transfer shaft includes a third transfer gear meshed with the first structural member and a fourth transfer gear meshed with the second shaft.

\* \* \* \* \*